(12) United States Patent
Chen et al.

(10) Patent No.: US 9,077,387 B2
(45) Date of Patent: Jul. 7, 2015

(54) OPERATION MODE SWITCHING MODULE AND ASSOCIATED METHOD

(71) Applicant: MStar Semiconductor, Inc., Hsinchu County (TW)

(72) Inventors: Chien-Sheng Chen, Hsinchu County (TW); Yung-Chih Lo, Hsinchu County (TW)

(73) Assignee: MSTAR SEMICONDUCTOR, INC., Hsinchu County (TW)

( * ) Notice: Subject to any disclaimer, the term of this patent is extended or adjusted under 35 U.S.C. 154(b) by 155 days.

(21) Appl. No.: 13/803,236

(22) Filed: Mar. 14, 2013

(65) Prior Publication Data
US 2014/0073242 A1 Mar. 13, 2014

(30) Foreign Application Priority Data
Sep. 10, 2012 (TW) .............................. 101132998 A

(51) Int. Cl.
*H04B 5/00* (2006.01)
*H04B 5/02* (2006.01)
*H04W 52/02* (2009.01)

(52) U.S. Cl.
CPC ................ *H04B 5/00* (2013.01); *H04B 5/0056* (2013.01); *H04B 5/0081* (2013.01); *H04B 5/02* (2013.01); *H04W 52/028* (2013.01)

(58) Field of Classification Search
CPC ...... H04B 5/0062; H04B 5/0037; H04B 5/02; H04B 5/0031; H04B 5/0075; H04B 7/00; H04B 7/0604; H04M 1/7253; H04M 2250/04; H04M 2250/12; H04W 52/0261; H04W 12/04; H04W 52/0258; H04W 52/08
USPC ................ 340/10.1, 10.2, 10.33, 10.51, 5.63, 340/10.4, 5.85, 572.8, 539.11, 568.1, 340/572.1; 370/310, 311, 338; 455/41.1–41.3, 411, 67.11, 412.1, 455/456.5, 556.1, 574, 66.1, 73
See application file for complete search history.

(56) References Cited

U.S. PATENT DOCUMENTS

| | | | |
|---|---|---|---|
| 2011/0059694 A1* | 3/2011 | Audic | 455/41.1 |
| 2012/0081131 A1* | 4/2012 | Hausmann et al. | 324/654 |
| 2013/0324036 A1* | 12/2013 | Hillan et al. | 455/41.1 |

* cited by examiner

Primary Examiner — Golam Sorowar
(74) Attorney, Agent, or Firm — WPAT, PC; Justin King

(57) ABSTRACT

An operation mode switching module for a switching a near-field communication device between a sleep mode and a communication mode is provided. The operation mode switching module includes a driver, a detector, and a state machine. The driver drives a resonant circuit to generate an oscillation signal. The detector detects a level of effect of the environment upon the oscillation signal. The state machine determines whether to switch the near-field communication device from the sleep mode to the communication mode according to the level of effect of the environment upon the oscillation signal.

11 Claims, 3 Drawing Sheets

OPERATION MODE SWITCHING MODULE AND ASSOCIATED METHOD

This application claims the benefit of Taiwan application Serial No. 101132998, filed Sep. 10, 2012, the subject matter of which is incorporated herein by reference.

BACKGROUND OF THE INVENTION

1. Field of the Invention

The invention relates in general to a near-field communication (NFC) device and associated control method, and more particularly to an operation mode switching module for switching the NFC device among various operation modes and an associated method for achieving power-saving.

2. Description of the Related Art

Near-field communication (NFC) radio-frequency identification (RFID) is a technique allowing data exchange between two devices through sensing within centimeters without coming into physical contacts. Mifare specifications proposed by NXP spun off from Philips and FeliCa specifications proposed by Sony, as two prominent standards of NFC RFID, prevail in transportation and financial applications.

The current NFC technology is initiatively defined by an industrial organization called the NFC Forum. Various operation modes defined by the NFC forum include a reader/writer mode, a peer-to-peer mode and a card-emulation mode. When operating in the reader/writer mode, an NFC device, behaving as a common NFC reader at this point, reads data from or writes data to a conventional NFC card. When operating in the peer-to-peer mode, two NFC devices are allowed to exchange data. For example, two NFC devices may shared Bluetooth or WiFi configuration parameters or exchange digital images. When operating in the card-emulation mode, an NFC device functions as a conventional NFC card with respect to an external card reader. The care-emulation mode is commonly implemented in wireless ticketing or paying systems. Apart from the three modes above, an NFC device may also operate in a wireless communication based on another protocol, depending on an expected function of the NFC device.

Accompanied with the prevalence of the NFC technology, the NFC technology is also employed in mobile devices (such as personal digital assistants) to bring users with convenient operation experiences. For example, a smart handset utilizing the NFC technology (to be referred to as an NFC handset) is operable in the card-emulation mode to perform small-amount payments through wireless means, in the reader/writer mode to read advertisements carried in a smart poster, or in the peer-to-peer mode to share photos therein with another smart handset.

Among the NFC operation modes, the reader/writer mode and the peer-to-peer mode involve extremely power-consuming operations, whereas the card-emulation mode is a less power-consuming mode. Approaches for switching the operation mode is a critical factor on a standby period of a mobile device.

A common approach for switching the operation mode is by manual means. For example, an NFC handset is configured to the card-emulation mode under normal circumstances. Only when a user selects a specific application in the NFC handset, the NFC handset enters the reader/writer mode or the peer-to-peer mode. Such approach is quite power-saving yet inconvenient from an operation perspective for a user.

Another approach is implemented by means of polling. For example, an NFC handset mostly operates in the card-emulation mode, and periodically, temporarily and automatically enters the reader/writer mode. Thus, when a user carrying the NFC handset and approaches a smart poster, the NFC is capable of automatically reading information contained in the smart poster. However, although this approach yields preferred operation conveniences, the power consumed by the NFC handset each time the NFC handset enters and operates in the reader/writer mode is quite considerable to reach as high as 50 mA. Such power consumption is lethal on the standby period of a mobile device.

Therefore, there is a need for a solution for selecting and switching an operation mode for enhancing operation conveniences and at the same time prolonging a standby period of a mobile device.

SUMMARY OF THE INVENTION

According to an embodiment the present invention, an operation mode switching module for switching a near-field communication (NFC) device between a sleep mode and a communication mode is provided. The operation mode switching module includes: a resonant circuit driver, for driving a resonant circuit to generate an oscillation signal; a detector, for detecting a level of effect of the environment upon the oscillation signal; and a state machine, for determining whether to switch the NFC device from the sleep mode to the communication mode according to the level of effect of the environment upon the oscillation signal.

According to another embodiment of the present invention, an operation mode switching method for switching an NFC device between a sleep mode and a communication mode is provided. The method includes steps of: prompting the NFC device to enter the sleep mode; driving a resonant circuit to generate an oscillation signal; detecting a level of effect of the environment upon the oscillation signal; and switching the NFC device from the sleep mode to the communication mode according to the level of effect of the environment upon the oscillation signal.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
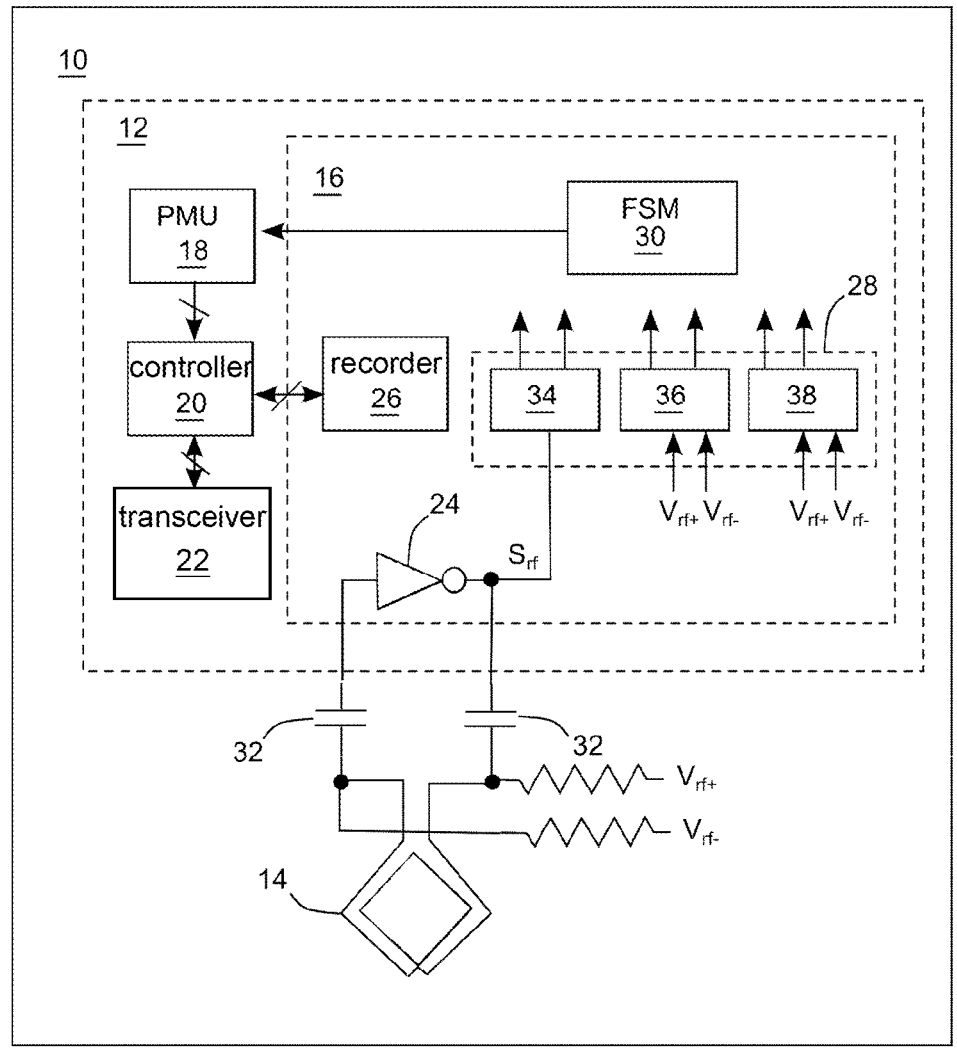
FIG. 1 is a near-field communication (NFC) device according to an embodiment of the present invention.

FIG. 1 shows a near-field communication (NFC) device 10 according to one embodiment of the present invention. The NFC device 10 is applicable to an NFC handset. However, it should be noted that the present invention is not limited to application of an NFC handset, and may be applied to any NFC apparatuses.

The NFC device 10 includes an NFC chipset 12 and a loop antenna 14. For example, the NFC chipset 12 is a single-chip. The NFC device 10 includes an operation mode switching module 16, a power management unit 18, a controller 20 and a transceiver 22.

When operating in one among the three operation modes defined by the NFC forum, the power management module 18 operates such that controller 20 and the transceiver 22 are powered, and the transceiver 22 drives the loop antenna 14. Through the loop antenna 14, the controller 20 transmits or receives an NFC signal to or from another external NFC device. Thus, in the description below, the three operation modes defined by the NFC Forum are referred to as three communication modes.

Apart from operating in a common communication mode, the NFC device 10 in FIG. 1 is also operable in a sleep mode. In the sleep mode, the operation mode switching module 16 is powered and operates, with however the controller 20 and the transceiver 22 basically being unpowered through controls of the power management unit 18. As such, the NFC device 10 does not transmit or receive an NFC signal in the sleep mode. In general, in the sleep mode, the transceiver 22 and the controller 20 that are more power-consuming are in equivalence powered off, and only the operation mode switching module 16 monitors environmental changes through the loop antenna 14. Thus, the NFC device 10 is quite power-saving in the sleep mode. The operation mode switching module 16 has an inverter 24, a recorder 26, an environment detector 28 and a finite-state machine (FSM) 30.

The FSM 30 records whether a current operation mode of the NFC device 10 is the sleep mode or one of the three communication modes, and accordingly controls the power management unit 18.

In FIG. 1, the loop antenna 14 and two capacitors 32 form a resonant circuit. In the sleep mode, the inverter 24 serves as a resonant circuit driver for driving the resonant circuit to generate an oscillation signal.

In the sleep mode, the environment detector 28 determines whether the environment where the NFC device 10 is located changes through detecting a level of effect of the environment upon the oscillation signal at the resonant circuit. For example, when the NFC device 10 approaches another NFC device, the oscillation signal at the resonant circuit changes as the capacitance of the loop antenna 14 changes. Once the change becomes significant enough, the environment detector 28 sends out a corresponding signal to liberate the FSM 30 from the sleep mode.

The environment detector 28 includes an oscillation frequency detector 34, a signal level detector 36 and an electromagnetic field detector 38. For example, the oscillation frequency detector 34 detects an oscillation frequency of an oscillation signal $S_{rf}$ generated by the resonant circuit formed by the loop antenna 14 and the capacitors 32. The signal level detector 36 detects amplitudes of oscillation signals $V_{rf+}$ and $V_{rf-}$ generated by the resonant circuit. The electromagnetic field detector 38 detects an electromagnetic field strength passing through the loop antenna 14.

In the sleep mode, the inverter 24 drives the loop antenna 14 and the capacitors 32 to generate the oscillation signals $S_{rf}$, $V_{rf+}$ and $V_{rf-}$, such that the frequencies of the oscillation signals are approximately equal to 1/sqr(LC), where sqr is a square root, L is an inductance value of the loop antenna 14, and C is an equivalent capacitance value of the resonant circuit.

When the environment of the NFC device is unchanged, e.g., when the NFC device 10 is not near any other NFC device, the inductance value of the loop antenna 14 stays at about a constant value. Given that oscillations are stable based on the constant inductance value, the oscillation frequency $f_{rf}$ of the oscillation signal $S_{rf}$ is approximately equal to an initial frequency $f_{ini}$, and amplitudes $A_{rf+}$ and $A_{rf-}$ of the oscillation signals $V_{rf+}$ and $V_{rf-}$ are approximately equal to an initial amplitude $A_{ini}$.

When the NFC device 10 in the sleep mode is near an external NFC card, a change occurs in the inductance value of the loop antenna 14 due to the emergence of another loop antenna (of the external NFC card), leading to a change in the frequency or amplitude of the oscillation signal generated by the resonant circuit. For example, the oscillation frequency detector 34 checks whether a noticeable difference exists between the oscillation frequency $f_{rf}$ of the oscillation signal $S_{rf}$ and the initial frequency $f_{ini}$; the signal level detector 36 detects whether a noticeable difference exists between the amplitudes $A_{rf+}$ and $A_{rf-}$ of the oscillation signals $V_{rf+}$ and $V_{rf-}$ and the initial amplitude $A_{ini}$. When the oscillation frequency detector 34 or the signal level detector 36 detects that a noticeable change is caused in the oscillation frequency $f_{rf}$ or the amplitudes $A_{rf+}$ and $A_{rf-}$, the oscillation frequency detector 34 or the signal level detector 36 notifies the FSM 30 by a frequency indicator Freq-indictor or a level indictor Level-indictor, respectively, to liberate the FSM 30 from the sleep mode, and to wake up the transceiver 22 and the controller 20.

When the NFC device 10 is near an external NFC reader/writer, the NFC device 10 enters a powerful electromagnetic field constructed by the external NFC reader/writer. Due to electromagnetic sensing, the oscillation signals $V_{rf+}$ and $V_{rf-}$ generated by the loop antenna 14 are fluctuated with great amplitudes as being influenced by the powerful electromagnetic field. The electromagnetic field detector 38 detects whether the amplitudes of the oscillation signals $V_{rf+}$ and $V_{rf-}$ exceed a predetermined threshold amplitude. If so, it means that a powerful electromagnetic field has arisen, and the electromagnetic field detector 38 notifies the FSM 30 by the field indictor Field-indictor to liberate the FSM 30 from the sleep mode and to wake up the transceiver 22 and the controller 20.

Upon detecting the powerful electromagnetic field by the electromagnetic field detector 38, the presence of an external NFC reader/writer is substantially proven by the powerful electromagnetic field detected. Thus, the NFC device 10 is liberated from the sleep mode to enter the card-emulation mode. At this point, the detection result of the oscillation frequency detector 34 or the signal level detector 36 may be omitted. Given that the liberation from the sleep mode is resulted by the oscillation frequency detector 34 or the signal level detector 36, and the electromagnetic field detector 38 does not detect a powerful electromagnetic field, it can be determined that the inductance value of the loop antenna 14 is affected by a substance in the vicinity, and so the NFC device 10 is liberated from the sleep mode to enter the reader/writer mode.

Figure 2:
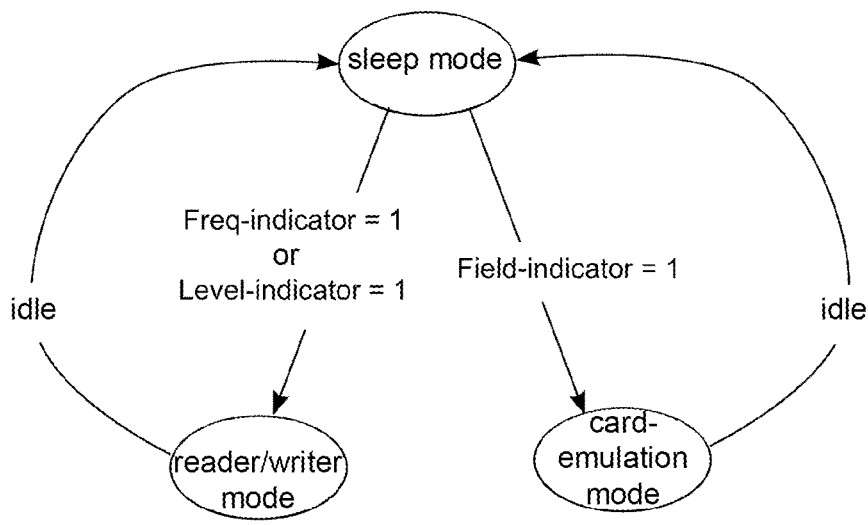
FIG. 2 depicts operation mode changes of the NFC device 10 in FIG. 1.

FIG. 2 shows operation mode changes of the NFC device 10. The electromagnetic field indictor Field-indictor has a higher priority than those of the frequency indicator Freq-indicator and the level indicator Level-indicator, and is capable of liberating the NFC device 10 from the sleep mode to enter the card-emulation mode. The frequency indicator Freq-indicator or the level indicator Level-indicator allows the NFC device 10 to liberate from the sleep mode to enter the reader/writer mode. In the card-emulation mode or the reader/writer mode, the NFC device 10 enters the sleep mode if the NFC device 10 is in an idle state for a considerable period. For example, in the card-emulation mode, the controller 20 identifies whether the powerful electromagnetic field disappears to determine whether the NFC device 10 is in the idle state. In the reader/writer mode, the controller 20 determines whether the NFC device 10 is in the idle state when the controller 20 discovers that no NFC signal is transmitted from the loop antenna 14.

Figure 3:
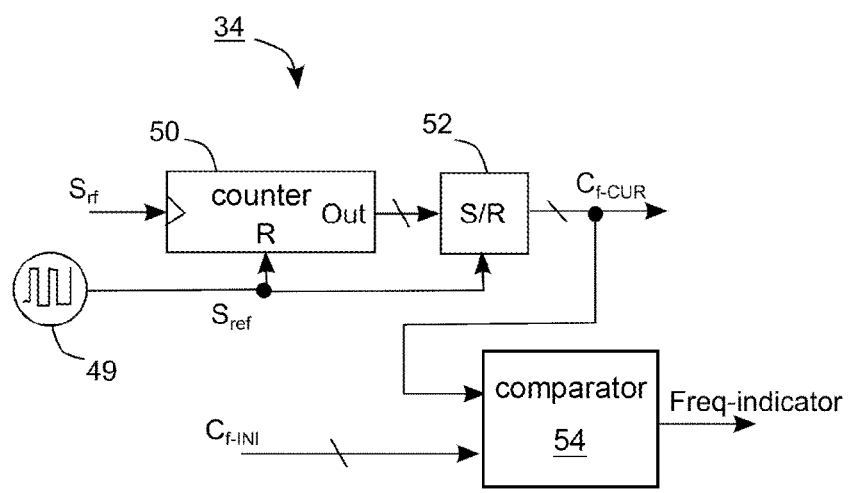
FIG. 3 is an oscillation frequency detector.

FIG. 3 shows an oscillation frequency detector 34. The oscillation frequency detector 34 includes a reference clock generator 49, a counter 50, a shift register 52 and a comparator 54. The oscillation signal $S_{rf}$ serves as a clock input of the counter 50. The reference clock generator 49 periodically resets an output of the counter 50 to zero according to a reference signal $S_{ref}$. The shift register 42 stores a counter result $C_{f\text{-}cur}$ of the counter 50 in each reference clock cycle. The counter result $C_{f\text{-}cur}$ corresponds to the oscillation frequency $f_{rf}$ of the current oscillation signal $S_{rf}$. The comparator 54 compares whether a noticeable difference exists between the counter result $C_{f\text{-}cur}$ and an initial value $C_{f\text{-}INI}$. It is to be later explained that, the initial value $C_{f\text{-}INI}$ may be the counter result $C_{f\text{-}cur}$ at the time when initially entering the sleep mode, and thus corresponds to the initial frequency $f_{ini}$. When the difference is significant enough, the frequency indicator Freq-indicator is at logic "1" or is else at logic "0".

Figure 4:
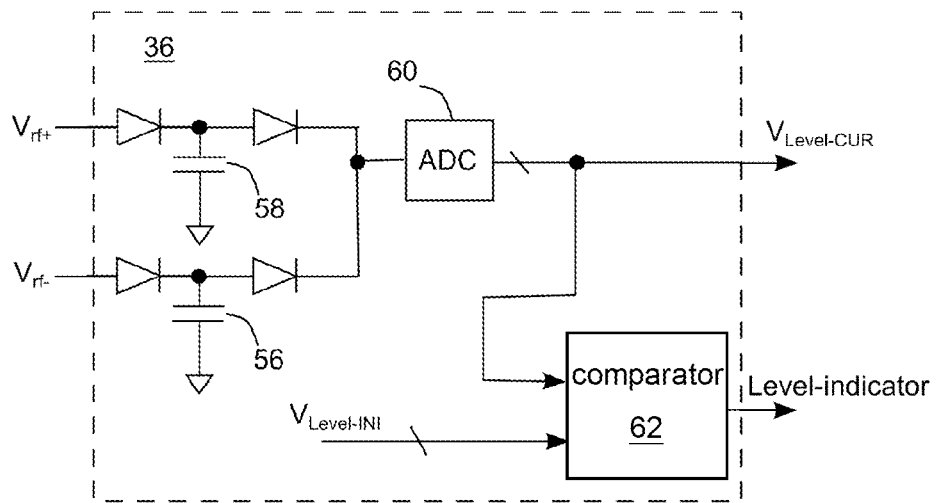
FIG. 4 is a signal level detector.

FIG. 4 shows a signal level detector 36. Capacitors 56 and 58 respectively record the amplitudes of the oscillation signals $V_{rf+}$ and $V_{rf-}$. The larger of the two amplitudes is converted to a digital value $V_{Level\text{-}CUR}$ through an analog-to-digital converter (ADC) 60. A comparator 62 checks whether a noticeable difference exists between the digital value $V_{Level\text{-}CUR}$ and an initial value $V_{Level\text{-}INI}$. It is to be later explained that the initial value $V_{Level\text{-}INI}$ may be the digital value $V_{Level\text{-}CUR}$ at the time when initially entering the sleep mode. Hence, the digital value $V_{Level\text{-}CUR}$ corresponds to the larger of the current amplitudes $A_{rf+}$ and $A_{rf-}$ of the oscillation signals $V_{rf+}$ and $V_{rf-}$, and the initial value $V_{Level\text{-}IN1}$ corresponds to an initial amplitude $A_n$, of the oscillation signals $V_{rf+}$ and $V_{rf-}$. When the difference between the digital value $V_{Level\text{-}CUR}$ and the initial value $V_{Level\text{-}INI}$ becomes significant enough, it means that a noticeable difference correspondingly exists between the amplitudes of the oscillation signals $V_{rf+}$ and $V_{rf-}$ and those when initially entering the sleep mode. Thus, the level indicator Level-indicator is at logic "1" or is else at logic "0".

Figure 5:
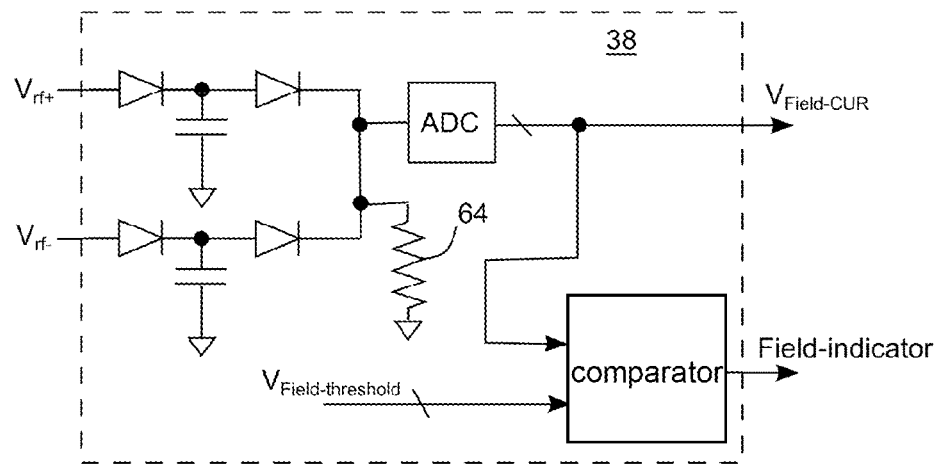
FIG. 5 is an electromagnetic field detector.

FIG. 5 shows an electromagnetic field detector 38. Compared to the level strength detector 36 in FIG. 4, the electromagnetic field detector 38 further includes a resistor 64. For a person having ordinary skill in the art, it can be easily appreciated that operations and functions of the electromagnetic field detector 38 are similar to those of the signal level detector 38, with however the electromagnetic field detector 38 being suitable in situations of detecting greater values of the amplitudes of the oscillation signals $V_{rf+}$ and $V_{rf-}$. In simple, when the electromagnetic field indictor Field-indicator is at logic "1", the amplitudes of the oscillation signals $V_{rf+}$ and $V_{rf-}$ are greater than a threshold amplitude corresponding to a threshold $V_{Field\text{-}threshold}$, or else the amplitudes of the oscillation signals $V_{rf+}$ and $V_{rf-}$ are smaller than the threshold amplitude. The threshold amplitude is expected to be greater than the initial amplitude $A_{ini}$ that is compared by the signal level detector 36.

In an alternative embodiment, the signal level detector 36 may be implemented by a circuit that is entirely different from that of the electromagnetic field detector 38.

Figure 6:
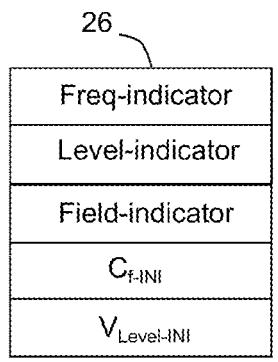
FIG. 6 depicts data stored in a recorder.

FIG. 6 shows data recorded in the recorder 26. The data includes the frequency indicator Freq-indicator, the level indictor Level-indicator, the electromagnetic field indicator Field-indicator, the initial value $C_{f\text{-}INI}$ and the initial value $V_{Level\text{-}INI}$. For example, the recorder 26 is a common memory or a flip-flop.

Referring to FIGS. 1, 2 and 6, when the NFC device 10 is to enter the sleep mode from a communication mode, the controller 20 and the transceiver 22 are both turned off; the inverter 24 prompts the resonant circuit to start oscillating; the recorder 26 records the current counter results $C_{f\text{-}CUR}$ and $V_{Level\text{-}CUR}$ as the initial values $C_{f\text{-}INI}$ and $V_{Level\text{-}INI}$, respectively; and logic values of the frequency indicator Freq-indicator, the level indictor Level-indicator, the electromagnetic field indicator Field-indicator recorded in the recorder 26 are all reset to zero. As previously stated, the initial values $C_{f\text{-}INI}$ and $V_{Level\text{-}INI}$ are basis for determining whether the NFC device 10 satisfies a condition for being liberated from the sleep mode. In the sleep mode, the resonant circuit continues oscillating. Once any of the frequency indicator Freq-indicator, the level indictor Level-indicator, and the electromagnetic field indicator Field-indicator generated by the environment detector 28 changes to logic "1", the FSM 30 wakes up the NFC device 10, so that the power management unit 18 starts powering the controller 20 and the transceiver 22. Meanwhile, the recorder 26 immediately records the current frequency indicator Freq-indicator, the level indictor Level-indicator, and the electromagnetic field indicator Field-indicator, which are reasons based on which the NFC device 10 is woken up. According to the frequency indicator Freq-indicator, the level indictor Level-indicator, and the electromagnetic field indicator Field-indicator recorded by the recorder 26, the awakened controller 20 determines whether to operate the NFC device 10 in the reader/writer mode or the card-emulation mode. Rules of the operation mode switching are as shown in FIG. 2.

In the sleep mode, when the electromagnetic field indicator Field-indicator changes to logic "1", it means that the amplitudes of the oscillation signals $V_{rf+}$ and $V_{rf-}$ are greater than the threshold amplitude corresponding to the threshold $V_{Field\text{-}threshold}$. As such, the NFC device 10 is woken up to operate in the card-emulation mode. In the sleep mode, when the electromagnetic field indicator Field-indicator maintains at logic "0", whereas the frequency indicator Freq-indicator or the level indicator Level-indicator changes to logic "1", it means that the inductance value of the loop antenna 14 is changed due to a change in the environment. Thus, the NFC device 10 is woken up to operate in the reader/writer mode.

According to the above descriptions, when the NFC device 10 in FIG. 1 is not near another NFC device, the NFC device 10 is nearly in the sleep mode at all times. It is experimentally proven that, the power consumption of the NFC device 10 in the sleep mode is less than 50 μA. That is to say, the NFC device 10 according to one embodiment of the present invention is extremely power-saving. When the NFC device 10 approaches an NFC card, the NFC device 10 automatically wakes up from the sleep mode to operate in the reader/writer mode. When the NFC device 10 approaches an NFC reader/writer, the NFC device 10 also automatically changes to the card-emulation mode. As such, the above automated operation mode switching brings a user with optimal operation conveniences.

When an NFC device 10 operating in the sleep mode approaches the metal of a non-NFC device, the NFC device 10 may be woken up due to the inductance change of the loop antenna 14 and enters the reader/writer mode. After a certain period of being idle, the NFC device 10 discovers that no NFC signal is transmitted from the loop antenna 14, and the NFC device 10 again enters the sleep mode according to the rules in FIG. 2. It should be noted that, in this round of sleeping mode, the initial values $C_{f\text{-}INI}$ and $V_{Level\text{-}INI}$ recorded in the recorder 26 are updated to the initial value at the time when the metal of the non-NFC device is in the vicinity. In other words, the NFC device 10 automatically updates the initial values $C_{f\text{-}INI}$ and $V_{Level\text{-}INI}$ according to environmental changes to adaptively adjust the switching condition for the operation mode.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An operation mode switching module, for switching a near-field communication (NFC) device between a sleep mode and a communication mode, the operation mode switching module comprising:
    a resonant circuit driver, for driving a resonant circuit to generate an oscillation signal;
    a detector, for detecting a level of effect of the environment upon the oscillation signal, comprising:
        a signal level detector, for detecting an amplitude of the oscillation signal; and
    a state machine, for determining whether to switch the NFC device from the sleep mode to the communication mode according to the level of effect of the environment upon the oscillation signal, wherein the communication mode comprises a reader/writer mode and a card-emulation mode
    wherein when a difference between the amplitude and an initial amplitude reaches a first threshold, the state machine switches the NFC device from the sleep mode to the communication mode, when the difference between the amplitude and the initial amplitude reaches the first threshold but does not reach a second threshold, the state machine switches the NFC device from the sleep mode to the reader/writer mode, and when the difference between the amplitude and the initial amplitude reaches the second threshold, the state machine switches the NFC device from the sleep mode to the card-emulation mode.

2. The operation mode switching module according to claim 1, wherein the detector further comprises an oscillation frequency detector for detecting a frequency of the oscillation signal; and when a difference between the frequency and an initial frequency reaches a third threshold, and the difference between the amplitude and the initial amplitude does not reach the second threshold, the state machine switches the NFC device from the sleep mode to the reader/writer mode.

3. The operation mode switching module according to claim 2, further comprising:
    a recorder, for recording the initial amplitude and the initial frequency corresponding to when the NFC device initially enters the sleep mode.

4. The operation mode switching module according to claim 3, wherein the recorder records a reason for switching the NFC device from the sleep mode to the communication mode.

5. The operation mode switching module according to claim 3, wherein the initial amplitude and the initial frequency are updated according to a change in the environment where the NFC device is located.

6. The operation mode switching module according to claim 1, wherein a transceiver and a controller of the NFC device are turned off when the NFC device is in the sleep mode.

7. An operation mode switching method, for switching an NFC device between a sleep mode and a communication mode comprising a reader/writer mode and a card-emulation mode, the operation mode switching method comprising:
    prompting the NFC device to enter the sleep mode;
    driving a resonant circuit to generate an oscillation signal;
    detecting a level of effect of the environment upon the oscillation signal;
    switching the NFC device from the sleep mode to the communication mode according to the level of effect of the environment upon the oscillation signal;
    recording an initial value corresponding to when the NFC device enters the sleep mode, wherein the initial value at least comprises an initial frequency and an initial amplitude; and
    detecting an amplitude of the oscillation signal, and switching the NFC device from the sleep mode to the communication mode when a difference between the amplitude and the initial amplitude reaches a first threshold,
    wherein when the difference between the amplitude and the initial amplitude reaches the first threshold but does not reach a second threshold, switching the NFC device from the sleep mode to the reader/writer mode, and when the difference between the amplitude and the initial amplitude reaches the second threshold, switching the NFC device from the sleep mode to the card-emulation mode.

8. The operation mode switching method according to claim 7, comprising:
    detecting a frequency of the oscillation signal; and
    when a difference between the frequency and an initial frequency reaches a third threshold, and the difference between the amplitude and the initial amplitude does not reach the second threshold, switching the NFC device from the sleep mode to the reader/writer mode.

9. The operation mode switching method according to claim 8, further comprising: recording a reason for switching the NFC device from the sleep mode to the communication mode.

10. The operation mode switching method according to claim 8, wherein the initial value is updated according to a change in the environment where the NFC device is located.

11. The operation mode switching method according to claim 7, wherein the step of prompting the NFC device to enter the sleep mode comprises: turning off a transceiver and a controller of the NFC device.

* * * * *